United States Patent Office 3,442,554
Patented May 6, 1969

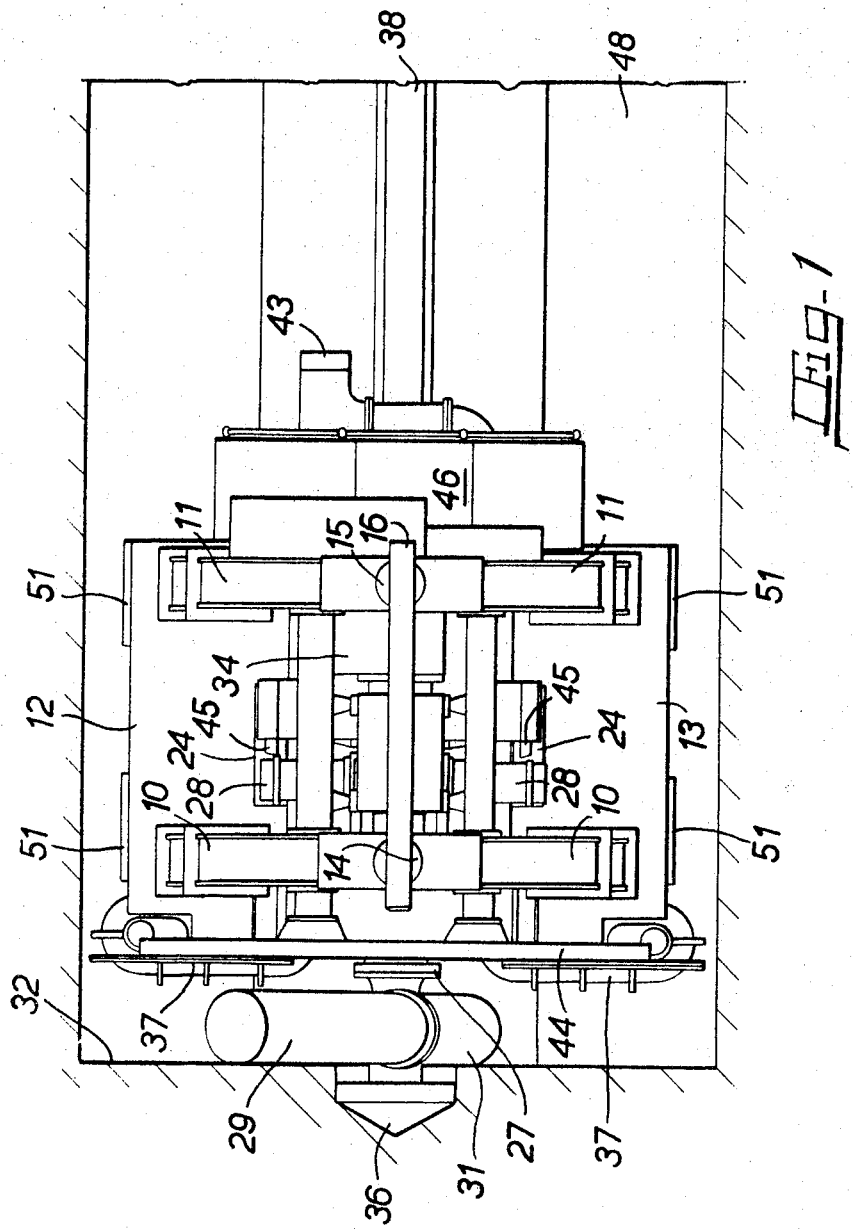

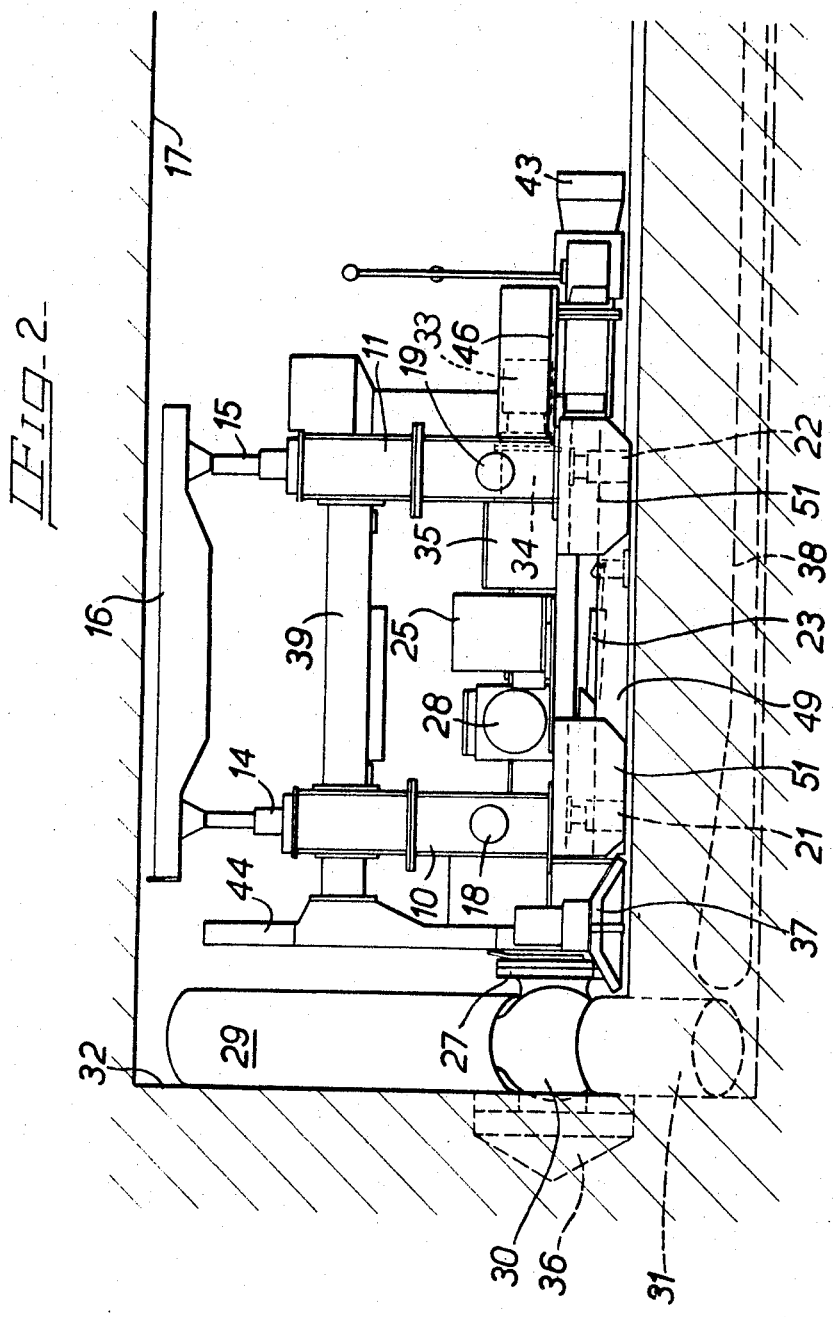

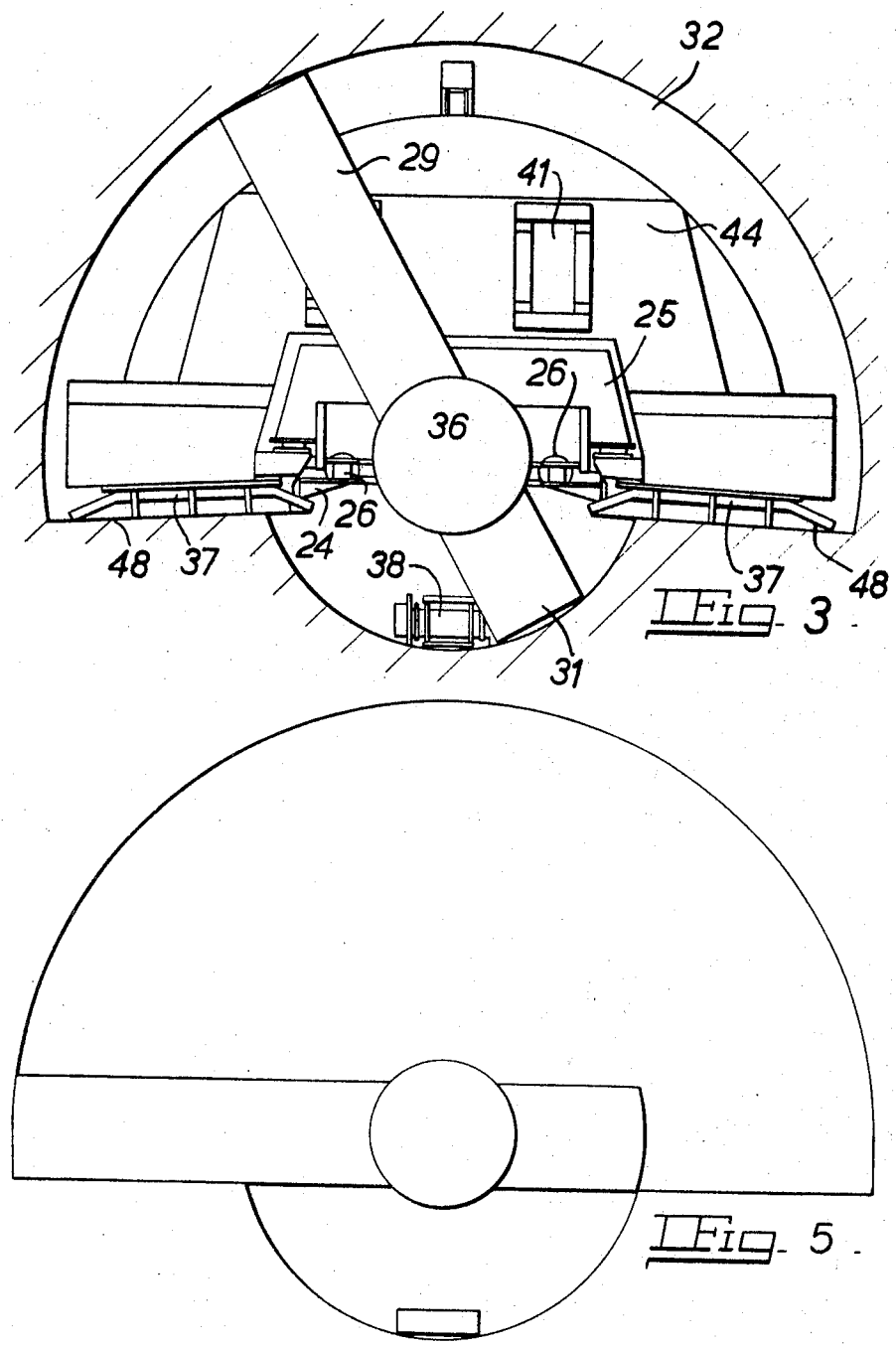

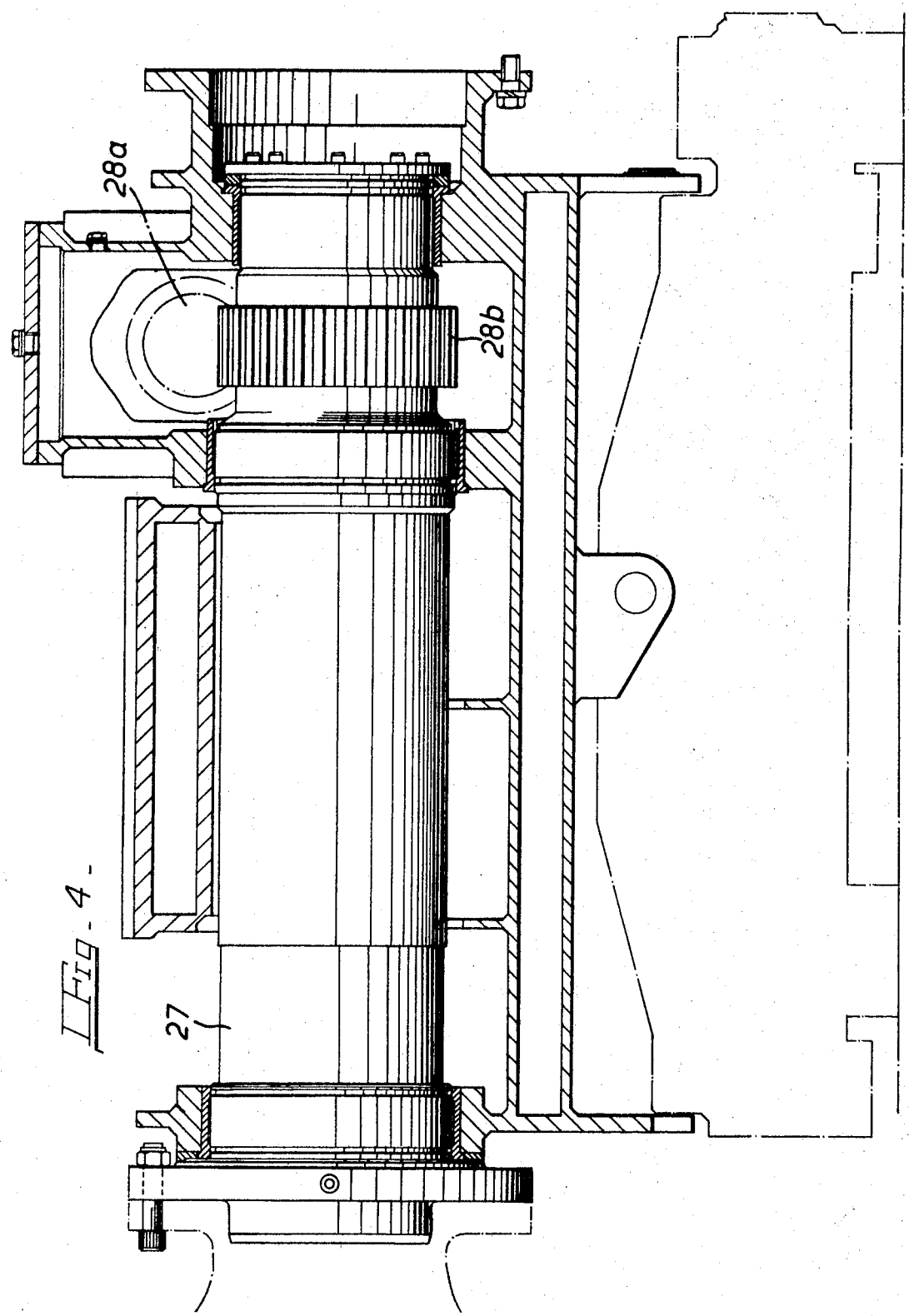

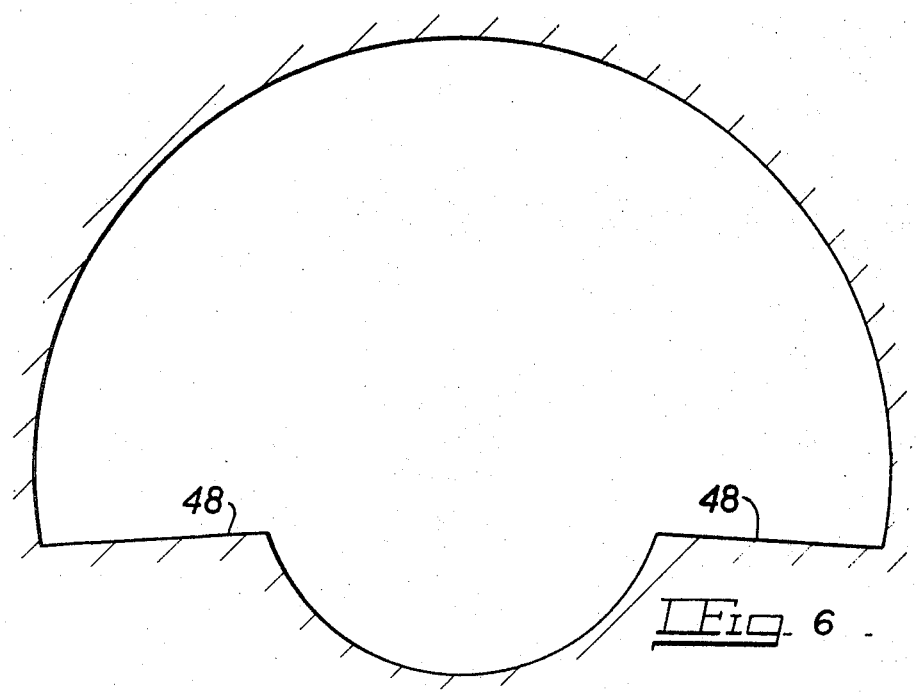

3,442,554
MACHINE FOR CUTTING A ROADWAY IN UNDERGROUND WORKINGS
Thomas Campbell Paul, Worcester, England, assignor to Dowty Meco Limited, Worcester, England, a British company
Filed Sept. 28, 1966, Ser. No. 582,581
Claims priority, application Great Britain, Sept. 28, 1965, 41,094/65
Int. Cl. E21d 9/00; E01g 3/04
U.S. Cl. 299—71   3 Claims

ABSTRACT OF THE DISCLOSURE

An apparatus for cutting a roadway in underground workings wherein a carriage is mounted on a frame work for movement with respect thereto, and a shaft is positioned on the carriage. A pair of arms having cutting drums are carried by the shaft and project radially therefrom, with said arms being of different lengths, so as to cut a roadway wherein the radius of one part is greater than that of the other part.

---

In the specification of our British Patent No. 957,716 we have described a machine for forming a roadway by enlarging an opening resulting from the excavation of a coal seam. An arm is mounted at the front of the machine for angular movement in a plane substantially parallel to the face being cut about a longitudinal axis extending in the direction of advance of the machine with respect to which the arm is substantially radial. Cutters are mounted on the arm about which they are rotatable, and means are provided for rotating the cutters about the arm and for swinging the arm about the longitudinal axis. If the arm is swung to and fro through an angle of 180° between opposed positions in which it is substantially horizontal the machine will enlarge the opening by cutting an additional part of semicircular cross-section and of a radius equal to the length of the arm.

The present invention is to provide a machine for forming a roadway in under ground workings where in cross section said roadway will have a portion above a horizontal plane and a portion below said horizontal plane. The radius of the part above the horizontal plane is greater than the radius of the part below the horizontal plane so that walkways are formed in the horizontal plane on each side of the lower part.

An object of the present invention is to provide a machine having a pair of angularly spaced arms of different lengths, having cutting means thereon for forming a road way having poritons of different radius in cross section.

Another object is to provide a machine having a reciprocating carriage mounted thereon with a shaft positioned on the carriage for angular movement about its longitudinal axis and a pair of diametrically opposed arms of different length extending radially from said shaft with rotatable arms for cutting into the face being worked.

Figure 7:
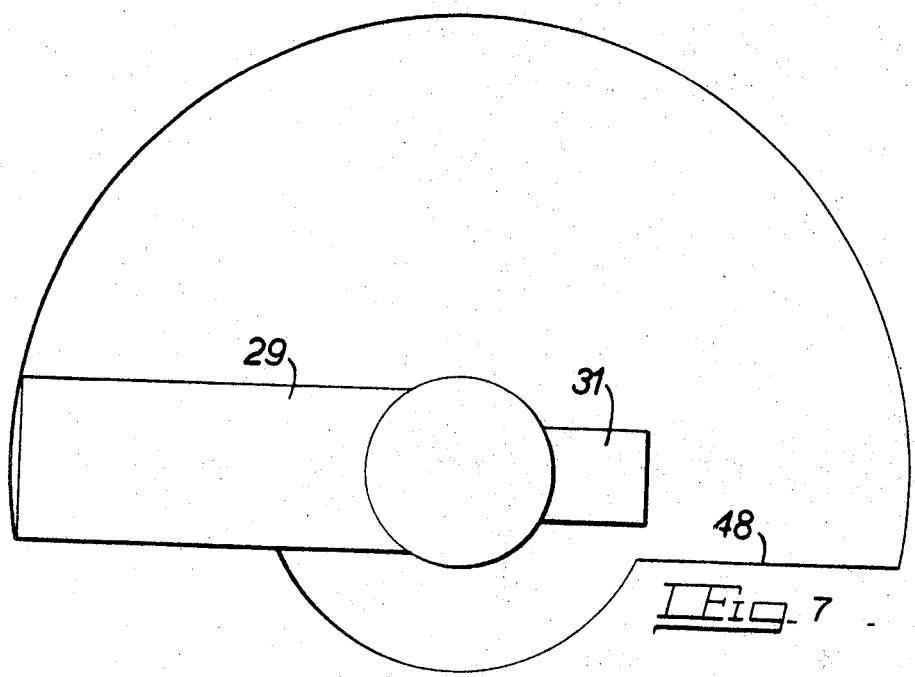
Figure 8:
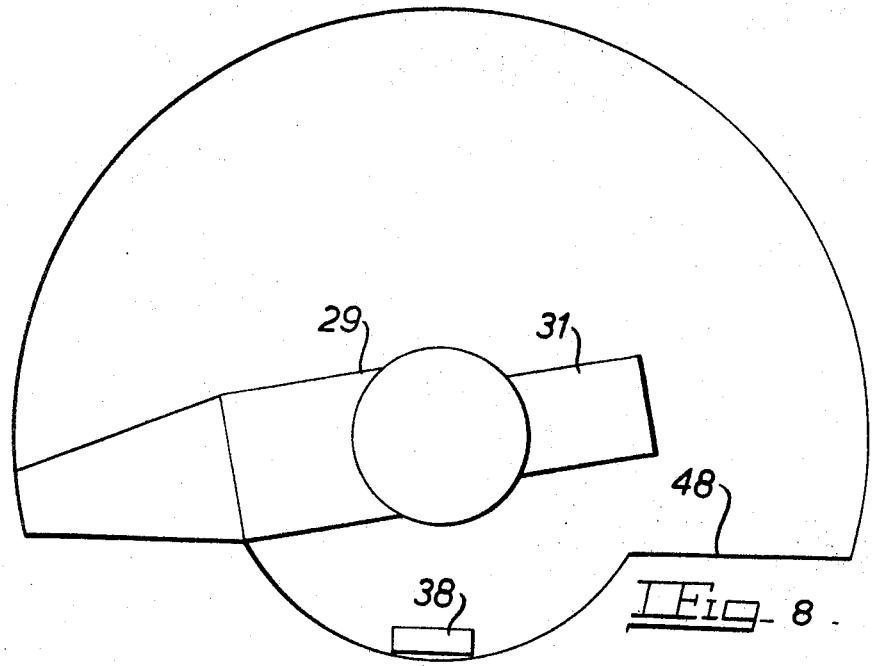

Our invention will now be further described with reference to the accompanying drawings in which:

FIGURE 1 is a plan of one convenient form of machine;
FIGURE 2 is a side elevation of the machine;
FIGURE 3 is a front end view of the machine;
FIGURE 4 is a fragmentary longitudinal section showing a portion of the hollow longitudinal shaft of the machine and the means for reciprocating it about its axis;
FIGURE 5 is a cross-section of a roadway cut by the machine shown in FIGURES 1 to 3; and
FIGURES 6, 7 and 8 are diagrammatic sections showing modifications in the form of the roadway.

The machine illustrated in FIGURES 1 to 3 comprises a framework incorporating two spaced and interconnected arch members 10, 11 supported on base members 12, 13. The arch members incorporate vertical hydraulic rams 14, 15 carrying a beam 16 adapted to be urged by the rams against the roof 17 of the working to stake the framework and hold it against movemnet while the machine is in operation.

The members 10, 11 also incorporate steering rams 18, 19 adapted to engage the sides of the working for staking the framework and for adjusting its direction. Under the outer sides of the base members 12, 13 are walking skids 51. Jacks 21, 22 are mounted in these skids for raising the framework to allow it to be advanced or retracted by hydraulic rams 23. The jacks 21, 22 also serve for adjusting the vertical attitude of the machine to give a certain measure of steering.

Slidably mounted in longitudinal guides 24 in the framework is a carriage 25 which is movable longitudinally by hydraulic rams 26.

A hollow longitudinal torque tube 27 is mounted centrally in the carriage for angular movement about its axis, the angular movement of the tube being effected by a transverse double-acting hydraulic ram or pair of opposed rams 28 actuating a rack meshing with pinion teeth on the shaft.

Rigidly secured to a flange at the forward end of the torque tube 27 is a gear-box 30 from which extend two diametrically opposed radial arms of different lengths, and cutting drums 29, 31 are mounted on the arms for rotation about the axes of the arms. These drums carry picks (not shown) for cutting into the face 32 at the end of the working. The drums are driven by bevel gearing housed in the gear-box 30 on the end of the torque tube 27, the drive to the gearing being by means of a shaft extending axially through the torque tube and driven by a motor 33 through a fluid coupling 34 and gear-box 35.

A short shaft second to and extending axially forward from the gear-box 30 carries a disc 36 which is provided with picks and acts as a pilot to cut a clearance for the portions of the gear-box not covered by the cutting drums.

A short transverse scraper conveyor 37 is located under the front of the machine at each side to collect broken material removed by the cutting drum 29 and feed it to a longitudinal conveyor 38 which is located below the machine and also collects material cut by the drum 31 and disc 36. Ducts 39 for dust-laden air extend from collecting heads 41 at the front of the machine to air outlets 43 at the rear end of the machine adapted to be connected to a trunk suction duct extending along the working.

The inlets 41 may be combined with a guard 44 which may also carry nozzles through which water can be sprayed on to the face to keep down the dust.

In the operation of the machine the framework is staked and the motor 33 is started to drive the cutting drums which will then be in a substantially horizontal position. The carriage is advanced relative to the framework by the rams 26 until the cutting drums have penetrated to the required distance into the face 32 to be cut. The carriage is then staked to the framework by locking rams 45 while the shaft 27 is moved angularly by the rams 28 through an angle of approximately 180°, the driving of the cutting drums being continued so that they remove a complete slice of material from the face.

The carriage is then advanced for the drums to make a further cut as the shaft makes a return arc or the shaft may be moved back on an idle return stroke before the carriage is advanced again.

All the operations are controlled by an operator standing on a platform 46 at the rear end of the machine where all the controls are grouped.

When the full forward movement of the carriage in the framework has been taken up the machine is stopped, the carriage is retracted, and the framework is unstaked and moved forwardly until the cutting drums are close to the face to be cut. The framework is then staked again and the cycle is repeated.

The cross-section of the roadway cut by the machine will depend on the relative lengths of the two arms carrying the cutting drums and the angle through which the hollow shaft 27 is reciprocated.

For example, if the shaft 27 is reciprocated through an angle of 180° with the longer arm 29 moving through an arc above a horizontal plane containing the axis of the shaft and the shorter arm moving through an arc below that plane the machine will cut a tunnel of the cross-section shown in FIGURE 5 in which the upper part is of a radius equal to the length of the longer arm and the lower half is of a radius equal to the length of the shorter arm. This produces on each side of the tunnel a flat horizontal walkway 48 of a width equal to the difference between the lengths of the arms, the level of the walkways being lower than the horizontal plane containing the axis of the shaft by an amount equal to the radius of the cutting drums.

If the longer arm is, say, 7 feet 6 inches longer and the shorter arm is 3 feet 6 inches long the resultant tunnel will provide walk-ways 4 feet wide on each side of a central channels of semi-circular cross-section and 3 feet 6 inches radius, the upper half of the tunnel being of semi-circular cross-section and 7 feet 6 inches radius.

To produce a tunnel of the section shown in FIGURE 6 the shaft 27 is reciprocated through an angle of slightly more than 180°, the walk-ways in that case being inclined at a small angle to the horizontal.

The cutting drums need not be of the same diameter and FIGURE 7 shows a tunnel cut by a machine in which the diameter of the cutting drum 29 on the longer arm is greater than that of the drum 31 on the shorter arm.

The cutting drum 29 on the longer arm may be tapered in diameter as shown in FIGURE 8 in which case horizontal walk-ways will be produced where the axis about which the arms swing is at a substantially higher level than the walk-ways.

Alternatively a tapered drum as shown in FIGURE 8 can be used to produce a tunnel in which the level of the walk-ways is lowered relative to the overall height of the tunnel so that more headroom is provided over the walk-ways.

The machine is supported on the walk-ways and the channels produced by the shorter arms provides clearance for any parts of the machine extending below the level of the skids and also allows the waste conveyor 38 to be carried through below the machine.

It will be appreciated that as the machine moves forwardly the tunnel will be supported in the usual way by steel arches inserted behind the machine.

After the roadway has been completed a stage loader can be located in the channel to receive coal from face conveyors extending laterally from the roadway and to transfer it to a main conveyor.

I claim:

1. In a machine for forming a roadway in underground workings and comprising a framework, a carriage mounted on the framework for movement thereon towards a face to be cut, and a hollow shaft mounted in the carriage for angular movement about its axis which is substantially at right angles to said face, the improvement comprising two diametrically opposed arms of different lengths extending radially from the forward end of said hollow shaft, picked drums rotatably mounted on said arms for rotation about the axes of the arms, and power means located in said carriage for reciprocating said hollow shaft about its axis and for rotating said cutting drums about said arms.

2. A machine as in claim 1 wherein said power means for reciprocating said hollow shaft about its axis comprise opposed hydraulic rams actuating a rack co-operating with teeth on said shaft.

3. A machine as in claim 1 wherein the cutting drum mounted on the longer arm is tapered in diameter.

References Cited

UNITED STATES PATENTS

| | | | |
|---|---|---|---|
| 2,760,766 | 8/1956 | Mayo | 299—31 |
| 3,004,753 | 10/1961 | Sik | 299—58 X |
| 3,290,095 | 12/1966 | Bredthaver | 299—57 |
| 3,306,663 | 2/1967 | Webster | 299—31 |
| 3,355,215 | 11/1967 | Haspert et al. | 299—56 |

ERNEST R. PURSER, *Primary Examiner.*

U.S. Cl. X.R.

299—31, 64